(12) United States Patent
Chen et al.

(10) Patent No.: US 6,254,068 B1
(45) Date of Patent: Jul. 3, 2001

(54) SHOCK ABSORBING SUPPORT ARRANGEMENT FOR A VIBRATION FEEDER

(75) Inventors: Meng-Chun Chen, Hsinchu Hsien; Chih-Chien Lin, Taipei Hsien; Fang Chang, Hsinchu, all of (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 0 days.

(21) Appl. No.: 09/460,401

(22) Filed: Dec. 13, 1999

(51) Int. Cl.$^7$ .................................................. F16M 1/00
(52) U.S. Cl. .................. 267/136; 267/141.1; 248/638
(58) Field of Search .................... 188/378, 379, 188/380; 248/636, 638; 267/136, 137, 141.1

(56) References Cited

U.S. PATENT DOCUMENTS

| | | | |
|---|---|---|---|
| 4,477,050 | * 10/1984 | Thompson et al. | 248/636 |
| 4,674,725 | * 6/1987 | Popper | 248/562 |
| 5,964,327 | * 10/1999 | Shih | 188/380 |
| 6,116,784 | * 9/2000 | Brotz | 248/638 |

* cited by examiner

Primary Examiner—Christopher P. Schwartz
(74) Attorney, Agent, or Firm—Bacon & Thomas, PLLC

(57) ABSTRACT

A shock absorbing support arrangement for a vibration feeder, which includes an upright support fixedly mounted on a bottom plate to hold a bearing, a carrier board slidably coupled to the upright support and supported on the bearing, two shock absorbing sliding mechanisms respectively mounted on the upright support at different elevations to hold the carrier board there between, enabling the carrier board to be smoothly oscillated upon operation of the vibration feeder.

7 Claims, 5 Drawing Sheets

SHOCK ABSORBING SUPPORT ARRANGEMENT FOR A VIBRATION FEEDER

BACKGROUND OF THE INVENTION

The present invention relates a vibration feeder, and more specifically to a shock absorbing support arrangement for a vibration feeder.

In a vibration feeder, a cam is moved with the output shaft of a motor relative to a shank, causing the shank to vibrate, and therefore work pieces are distributed to assembly lines in good order. Because shocks are produced during the operation of the vibration feeder, the component parts around the shank tend to be damaged.

SUMMARY OF THE INVENTION

It is one object of the present invention to provide a shock absorbing support arrangement, which lessens shock waves during the operation of the vibration feeder, preventing damage to surrounding mechanisms. It is another object of the present invention to provide a shock absorbing support arrangement, which is practical for use in any of a variety of vibration feeders. According to the preferred embodiment of the present invention, the shock absorbing support arrangement comprises an upright support fixedly mounted on a bottom plate to hold a bearing, a carrier board slidably coupled to the upright support, two shock absorbing sliding mechanisms respectively mounted on the upright support at different elevations to hold the carrier board there between, enabling the carrier board to be smoothly oscillated upon operation of the vibration feeder.

DETAILED DESCRIPTION OF THE PREFERRED EMBODIMENT

Figure 1:
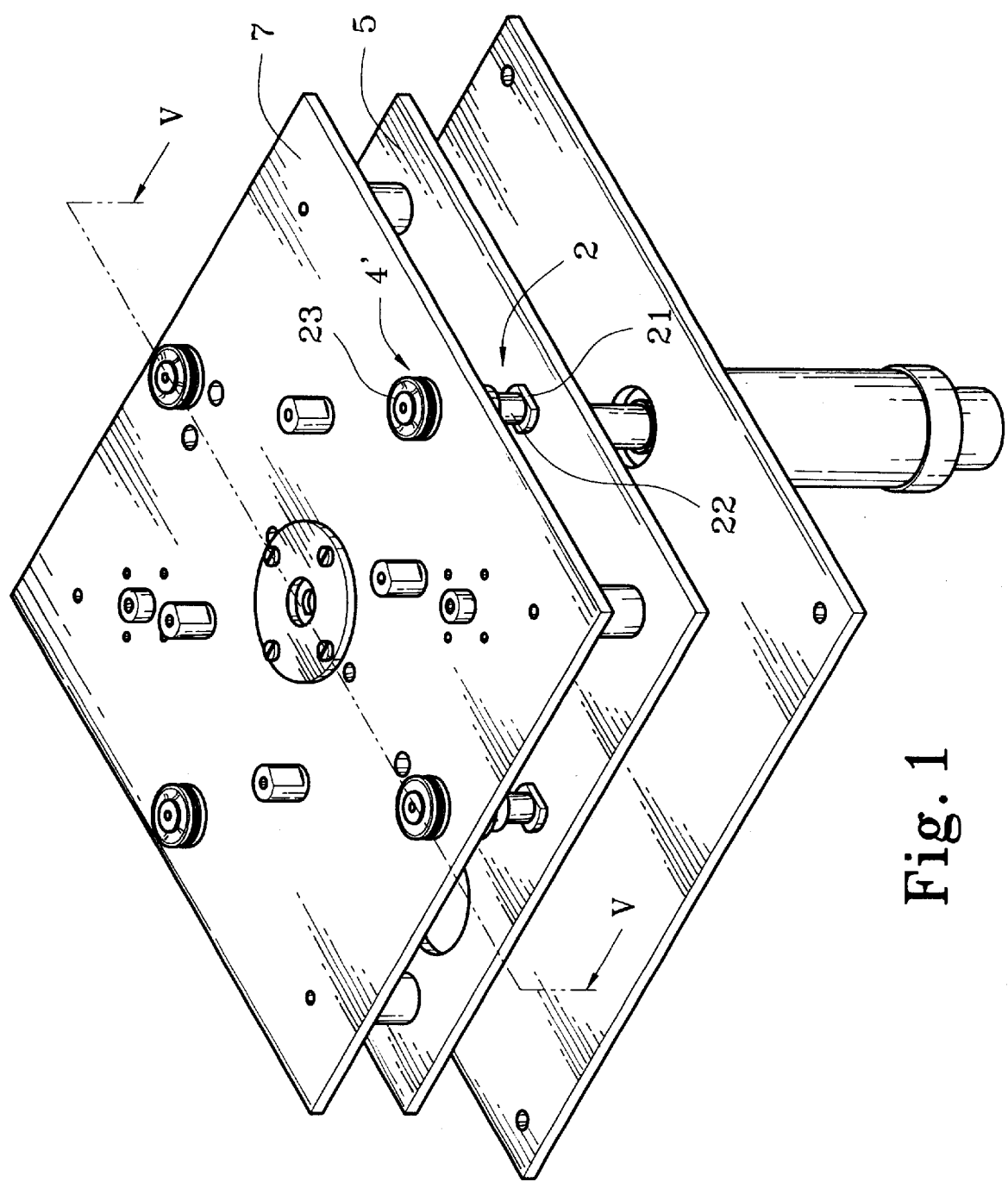
FIG. 1 is a perspective assembly view of the preferred embodiment of the present invention.
Figure 2:
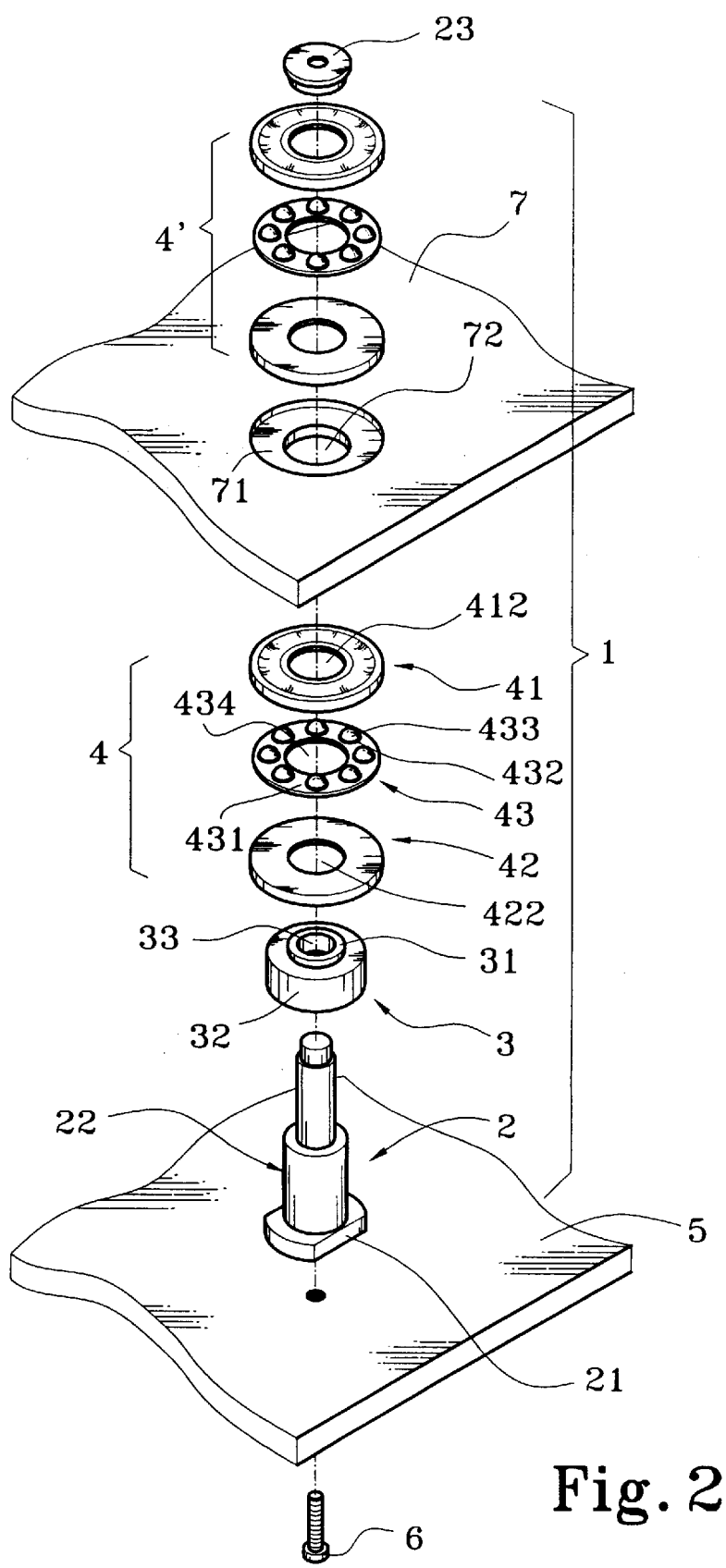
FIG. 2 is an exploded view of the preferred embodiment of the present invention.
Figure 3:
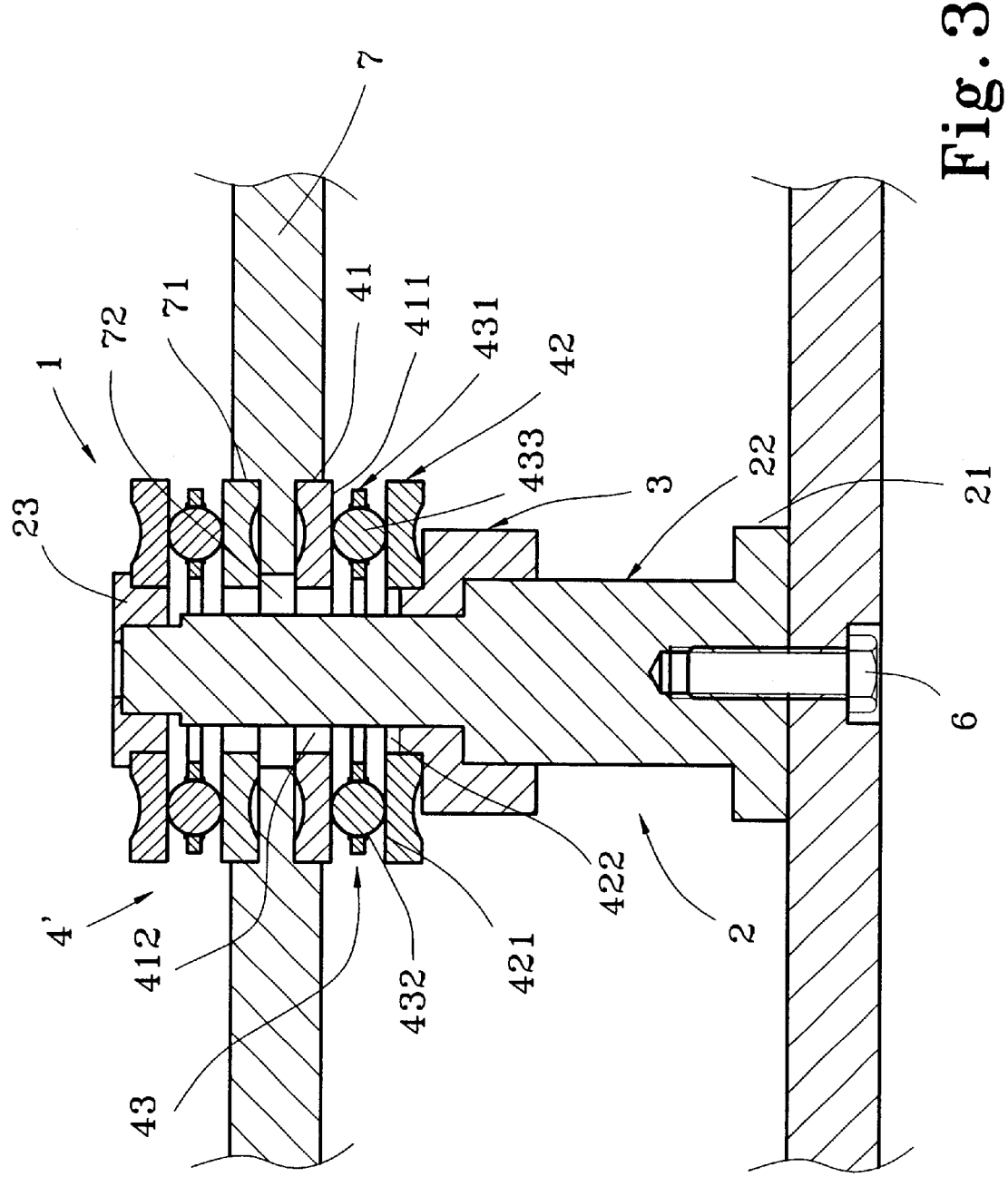
FIG. 3 is a side view in section in an enlarged scale of the preferred embodiment of the present invention.

Referring to FIGS. from 1 through 3, the present invention provides to a shock absorbing support arrangement 1 for a vibration feeder, which absorb shocks during the operation of the vibration feeder. The shock absorbing support arrangement 1 is comprised of an upright support 2, a bearing 3, and two shock absorbing mechanisms 4 and 4'. The upright support 2 comprises a mounting base 21 fixedly fastened to a bottom plate 5 by a screw 6, and a stepped shank 22 raised from the mounting base 21. The bearing 3 is mounted on the stepped shank 22 of the upright support 2, comprising an elastic body 32. The elastic body 32 comprises a center through hole 33, which receives the stepped shank 22, and an annular flange 31 rose from the top sidewall thereof around the center through hole 33. The shock absorbing mechanisms 4 and 4' are respectively mounted on the upper section of the stepped shank 22 and supported on the bearing 3 with a carrier board 7 retained between the shock absorbing mechanisms 4 and 4'. After installation of the shock absorbing mechanisms 4 and 4' and the carrier board 7, an end cap 23 is fastened to the stepped 15 shank 22 to fix the shock absorbing mechanisms 4 and 4', the carrier board 7, and the support 2 together. The carrier board 7 has a through hole 72, which receives the stepped shank 22, and two recessed portions 71 respectively disposed on top and bottom side walls thereof around the through hole 72. The shock absorbing mechanisms 4 and 4' each comprise a first annular cushion 41, a second annular cushion 42, and an annular sliding device 43 retained between the annular cushions 41 and 42. The first annular cushions 41 of the two shock absorbing mechanisms 4 and 4 are respectively fitted into the recessed portions 71 on the top and bottom side walls of the carrier board 7. The annular sliding device 43 comprises an annular disk 431 having a center through hole 434 and a plurality of locating holes 432 equiangularly spaced around the center through hole 434, and a plurality of movable elements (steel balls or needle rollers) 433 respectively moved in the locating holes 432 and disposed in contact with the smooth bottom side wall 411 of the first annular cushion 41 and the smooth top side wall 421 of the second annular cushion 42. The center through hole 412, 422, or 434 of the first annular cushion 41, the second annular cushion 42, or the annular sliding device 43 has a diameter greater than the diameter of the upper section of the stepped shank 22 of the support 2. When installed, the annular flange 31 of the bearing 3 fitted into the center through hole 422 of the second cushion 42 of one shock absorbing mechanism 4.

Figure 4:
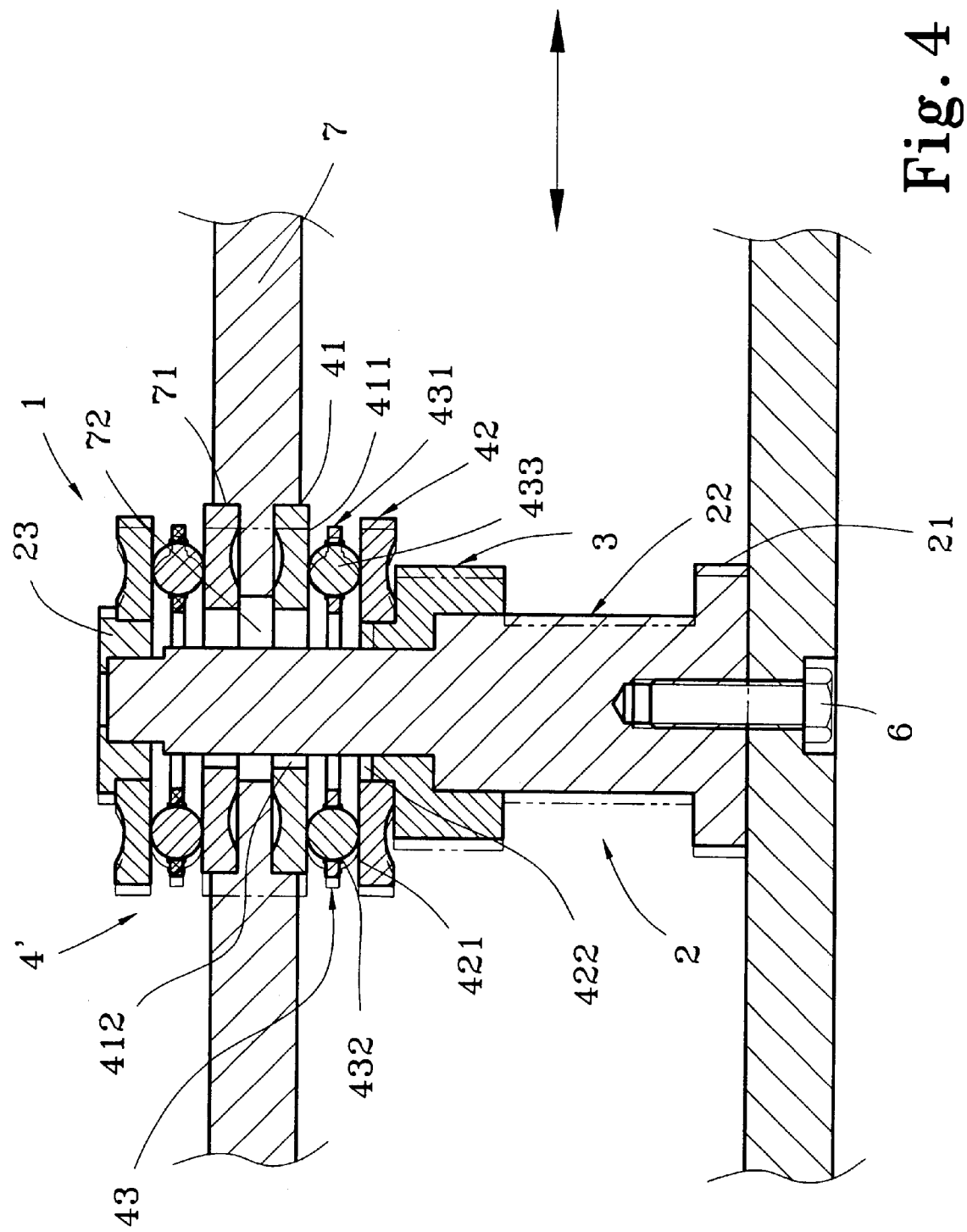
FIG. 4 is similar to FIG. 3 but showing the upright support oscillated.
Figure 5:
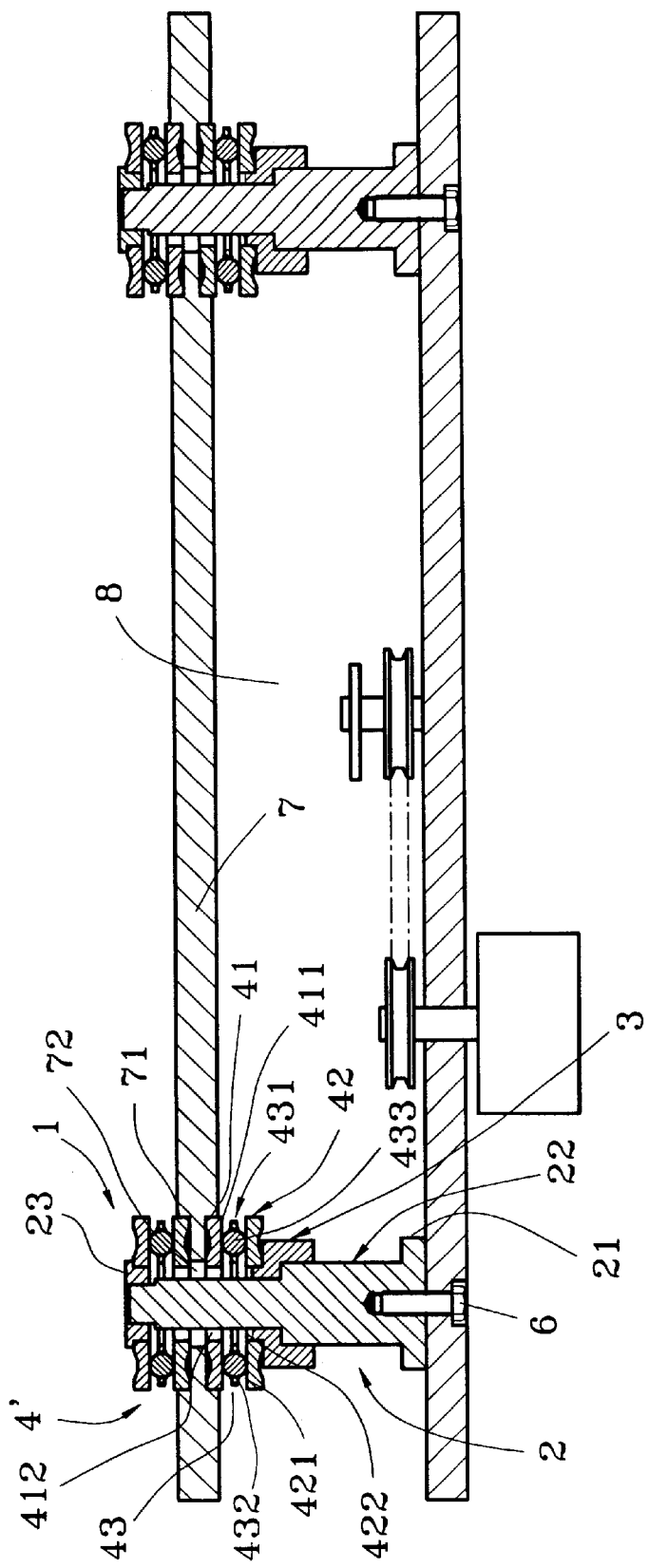
FIG. 5 is a sectional view taken along line V—V of FIG. 1.

Referring to FIGS. 4 and 5, when the vibration mechanism 8 of the vibration feeder is started, the support 2 is moved with the bottom plate 5, causing the second annular cushions 42 of the two shock absorbing mechanisms 4 and 4' to be moved with the bearing 3, the end cap 23 and the stepped shank 22 relative to the respective annular sliding device 43, and therefore the carrier board 7 is smoothly oscillated.

What the invention claimed is:

1. A shock absorbing support arrangement comprising:
    a bottom plate;
    a carrier board spaced above said bottom plate, said carrier board comprising a through hole, and two recessed portions respectively disposed on top and bottom side walls thereof around the through hole;
    an upright support fixedly mounted on said bottom plate, said upright support comprising a shank inserted through the through hole on said carrier board;
    a bearing mounted on said upright support to support said carrier board, said bearing comprising an elastic body mounted on an upper section of said shank, said elastic body comprising a center through hole, which receives said shank, and an annular flange raised from a top sidewall thereof around the center through hole thereof;
    a first shock absorbing mechanism and a second shock absorbing mechanism respectively mounted on said shank at two opposite sides of said carrier board above said bearing, said first shock absorbing mechanism and said second shock absorbing mechanism each comprising a first annular cushion respectively disposed in contact with said carrier board, a second annular cushion, and an annular sliding device retained between said first annular cushion and said second annular cushion, said first annular cushion and said second annular cushion and said annular sliding device each having a center through hole of diameter greater than said shank, said annular sliding device comprising an annular disk having a plurality of equiangularly spaced locating holes, and a plurality of movable elements respectively moved in said locating holes and disposed in contact with the corresponding first annular cushion and the corresponding second annular cushion.

2. The shock absorbing support arrangement of claim 1 wherein said shank of said upright support is a stepped shank.

3. The shock absorbing support arrangement of claim 1 wherein the first annular cushion of each of said shock absorbing mechanisms is respectively fitted into the recessed portions on said carrier board.

4. The shock absorbing support arrangement of claim 1 wherein the first annular cushion and second annular cushion of each of said shock absorbing mechanisms each have a smooth side wall disposed in contact with the movable elements of the respective annular sliding device.

5. The shock absorbing support arrangement of claim 1 wherein said movable elements are steel balls.

6. The shock absorbing support arrangement of claim 1 wherein said movable elements are needle rollers.

7. The shock absorbing support arrangement of claim 1 further comprising an end cap fastened to said shank to secure said shock-absorbing mechanisms, said carrier board and said bearing in place.

* * * * *